(12) United States Patent
Cha

(10) Patent No.: US 9,502,037 B2
(45) Date of Patent: Nov. 22, 2016

(54) WIRELESS CAPTION COMMUNICATION SERVICE SYSTEM

(71) Applicant: Miracom USA, Inc., Brea, CA (US)

(72) Inventor: Wonjae Cha, Yongin-si (KR)

(73) Assignee: Miracom USA, Inc., Brea, CA (US)

(*) Notice: Subject to any disclaimer, the term of this patent is extended or adjusted under 35 U.S.C. 154(b) by 0 days.

(21) Appl. No.: 14/597,133

(22) Filed: Jan. 14, 2015

(65) Prior Publication Data

US 2016/0203818 A1    Jul. 14, 2016

(51) Int. Cl.
*G10L 15/26*    (2006.01)

(52) U.S. Cl.
CPC ..................... *G10L 15/26* (2013.01)

(58) Field of Classification Search
CPC ....................................................... G10L 15/26
USPC .............................. 704/235, 260, 270.1, 271
See application file for complete search history.

(56) References Cited

U.S. PATENT DOCUMENTS

| 2007/0143103 A1* | 6/2007 | Asthana | H04M 3/567 704/200 |
| 2013/0058270 A1* | 3/2013 | Cha | H04M 3/42391 370/315 |

\* cited by examiner

*Primary Examiner* — Marcellus Augustin
(74) *Attorney, Agent, or Firm* — East West Law Group; Heedong Chae

(57) ABSTRACT

A Wireless Caption Communication Service ("WCCS") System includes a relay center, a wireless caption communication device, and a wireless captioning service server. The wireless caption communication device has a voice collecting device and a wireless caption communication terminal. Text entered by a first user is transmitted to the wireless captioning service server and converted into a speech. Then, the speech is transmitted to the voice collecting device and the sound of the speech comes out of a speaker of the voice collecting device so that a second user can hear the speech. The voice of the second user is transmitted to the wireless captioning service server and then to the relay center. The voice is converted into a caption data and transmitted to the wireless caption communication device, and the caption data is displayed on the wireless caption communication terminal so that the first user can read the caption data.

9 Claims, 7 Drawing Sheets

WIRELESS CAPTION COMMUNICATION SERVICE SYSTEM

BACKGROUND OF THE INVENTION

Field of Technology

The present invention relates to a wireless caption communication service system for the hearing impaired. More specifically, the invention relates to a wireless caption communication service system for helping proper and effective short-range conversation between a person with hearing loss (a "first user") and another person without hearing or speaking handicap (a "second user"). The present invention converts what the second user says into a caption data and displays the caption data on a wireless caption communication device so that the first user can see the caption data in real time. In addition, the present invention converts a text, which the first user types on the wireless caption communication device, into a speech, and the speech comes out of a speaker of the present invention so that the second user can hear the speech. In this way, even if the second user does not have knowledge of sign language, the second user can communicate with the first user having hearing impairment, and the first user does not have to write down to communicate with the second user.

Background of the Invention

Subtitle service systems are commonly used on television or for conferences or Telecommunications Relay Service ("TRS") to aid the hearing impaired. However, conventional subtitle service systems provided on television or conferences are not suitable for use on a daily basis for the people with hearing disability to have normal conversations with others unless the other person knows sign language. Telecommunication relay services are being used to help the hearing impaired to have a conversation with someone else in the distance and they are not suitable for the hearing impaired to use on everyday life to communicate with others. On everyday life, the hearing impaired generally use sign language or writing. However, if the other person does not have knowledge on sign language, sign language does not help. Writing requires both persons write and thus, communication by writing is not effective or convenient.

PRIOR ART

Patent Literature

Laid-open patent application, Republic of Korean 10-2010-0050959, communication system of hearing-impaired person.

Problem to be Solved by this Invention

This invention was designed to solve above mentioned problems. The purpose of this invention is to provide a hearing-impaired person with a convenient way to have a face-to-face conversation with others or another person with same disability by using a wireless caption communication service system. The wireless caption communication service system comprises a wireless caption communication device for displaying the caption data converted from the voice of the other person simultaneously or after he or she speaks, and the wireless caption communication service system converts the text entered from the user into a speech and the speech comes out of a speaker of the system so that the other person can hear the speech.

Means to Solve Problem

The present invention contrives to solve the disadvantages of the prior art. The present invention provides a wireless caption communication service system for the hearing impaired. More specifically, the invention relates to a wireless caption communication service system for helping proper and effective conversation between a person with hearing loss (a "first user") and another person without hearing or speaking handicap (a "second user").

The object of the invention is to provide a Wireless Caption Communication Service ("WCCS") System, which include a relay center, a wireless caption communication device, and a wireless captioning service server. The relay center receives a voice from the second user and converts the voice into a text-based caption data. The wireless caption communication device connects a voice call to conduct a conversation, receives the caption data from the relay center and displays the caption data so that the first user can see, and receives a text from the first user and outputs a speech converted from the text. In addition, the wireless captioning service server receives the voice from the second user through a path set by the wireless caption communication device and transmits the voice to the relay center, receives the caption data converted from the voice by the relay center, and transmits the caption data to the wireless caption communication device.

Another object of the invention is to provide a WCCS System having the wireless caption communication device. The wireless caption communication device includes a voice collecting device and a wireless caption communication terminal. The voice collecting device receives and transmits the voice of the second user and outputs the speech so that the second user can hear the speech. The wireless caption communication terminal receives the voice from the voice collecting device and transmits the voice to the wireless captioning service server. In addition, the wireless caption communication terminal receives the speech and transmits the speech to the voice collecting device, and receives the caption data from the relay center and displays the caption data.

Still another object of the invention is to provide a WCCS System, having the voice collecting device. The voice collecting device includes a voice input unit, a voice output unit and a short-range wireless (or wired) communication module. The voice input unit receives the voice from the second user and converts the voice into an electrical signal through a microphone and then, the voice input unit transmits the voice in a form of the electrical signal. The voice output unit outputs the speech, which is received from the wireless caption communication terminal, through a speaker. In addition, the short-range wireless (or wired) communication module receives the voice from the voice input unit and transmits the voice to the wireless caption communication terminal.

Still another object of the invention is to provide a WCCS System, having the wireless caption communication terminal. The wireless caption communication terminal includes an application part, a dialer part, an OS/virtual machine part, a short-range wireless (or wired) communication main module, and a network communication module. The application part controls an interface with the first user and the wireless caption communication service. The application part transmits the text to the wireless captioning service server or converts the text into the speech without transmitting the text to the wireless captioning service server. The dialer part makes a voice call. The OS/virtual machine part controls or operates a voice call or connection with a packet service. The short-range wireless (or wired) communication main module receives the voice from the short-range wireless (or wired) communication module of the voice collecting device. In addition, the network communication module makes a connection with a mobile communication network.

Still another object of the invention is to provide a WCCS System, having the wireless captioning service server. The wireless captioning service server includes a WCCS interface, a relay center interface, and a handler part. The WCCS interface is connected to the wireless caption communication terminal, controls a call, and receives the voice of the second user from the wireless caption communication device. The relay center interface is connected to the relay center, controls the call, and transmits the voice to the relay center. Moreover, the handler part controls the WCCS interface and the relay center interface.

Still another object of the invention is to provide a WCCS System wherein the WCCS interface transmits the voice to the relay center interface. In addition, the WCCS interface converts the text of the first user into the speech and transmits the speech to the wireless caption communication device.

Advantages of the Invention

The advantages of the present invention are: (1) the present invention provides a wireless caption communication service system to allow a hearing-impaired person to have a short-range normal conversation on a daily basis without the help of sign language translators or the need of setting up any equipment; (2) the system of the present invention is available on a specially designed wireless caption communication terminal or an application downloaded on a user's mobile phone or smart phone; (3) it is easy and convenient for a person to communicate with a hearing-impaired person without the use of sign language or writing because the person can just speak to the voice collecting device of the system in order to talk to the hearing-impaired person.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
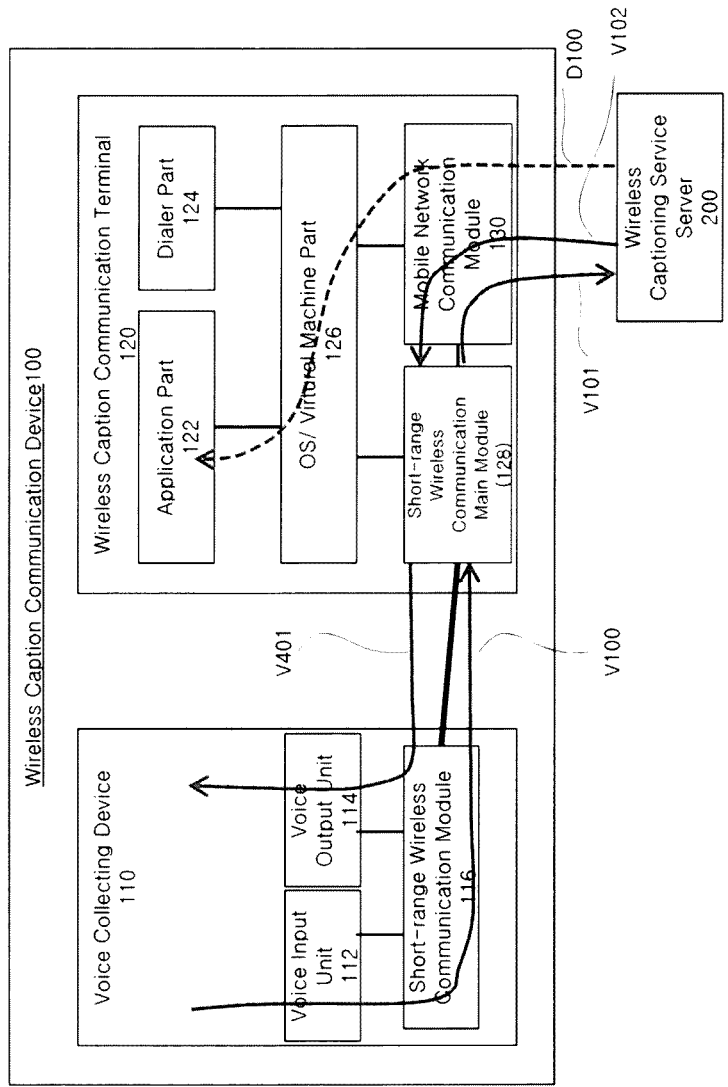
FIG. 1 shows a block diagram for a wireless caption communication device according to a preferred embodiment of the present invention.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

The present invention provides a service system for a hearing impaired person to have a normal conversation with another person. A wireless caption communication device 100 makes a connection to a wireless captioning service server 200. Then, the hearing impaired person enters a text into the wireless caption communication terminal 120 and the service system converts the text into a speech and outputs the speech through a voice output unit 114, for example a speaker, so that the other person can hear the speech. Furthermore, the voice of the other person is received by the wireless caption communication device 100 and transmitted to the relay center 300 through the wireless captioning service server 200. Then, the voice is converted to a caption data and the caption data is transmitted to the wireless caption communication terminal 120. The wireless caption communication terminal 120 displays the caption data so that the hearing impaired person can see the caption data.

The wireless caption communication device 100 sends the voice to the wireless captioning service server 200 through a pre-set traffic path, and the wireless captioning service server 200 transmits the voice to the relay center 300. Then, the relay center 300 converts the voice into a text-based caption data and transmits the caption data back to the wireless captioning service server 200.

The wireless captioning service server 200 may convert the voice into white noise. In addition, the wireless captioning service server 200 may convert the text, received from the wireless caption communication terminal 120, into a speech. The speech may be transmitted back to the wireless caption communication device 100. Furthermore, the wireless captioning service server 200 transmits the caption data, received from the relay center 300, to the wireless caption communication terminal 120.

FIG. 1 shows a block diagram for a wireless caption communication device 100 according to a preferred embodiment of the present invention. The wireless caption communication device 100 includes a voice collecting device 110 for receiving a user's voice and a wireless caption communication terminal 120 for receiving the voice and transmitting the voice to the wireless captioning service server 200. Additionally, the wireless caption communication terminal 120 controls the network connection and the user interface.

For the first and second users to have a conversation, the first user, who is hearing impaired, uses the wireless caption communication terminal 120, and the second user, who is not hearing impaired, uses the voice collecting device 110.

The voice collecting device 110 includes a voice input unit 112, a voice output unit 114, and a short-range wireless (or wired) communication module 116. The voice input unit 112 receives a user's voice and transmits the voice in an electrical signal, and the voice output unit 114 receives the speech from the wireless caption communication terminal 120 and outputs the speech through a speaker. The short-range wireless (or wired) communication module 116 transfers the voice received from the voice input unit 112 to the wireless caption communication terminal 120 through a wired or wireless path.

The voice input unit 112 may toe a microphone and the voice output unit 114 may be a speaker, a headphone, or an earphone. A Bluetooth may be used as a short-range wireless communication module 116. Accordingly, a headset having a Bluetooth can be a good example of the voice collecting device 110. A headset combines a headphone with a microphone. These are examples only and the present invention is not limited to these examples.

The wireless caption communication terminal 120 includes an application part 122, a dialer part 124, an OS/virtual machine part 126, a short-range wireless (or wired) communication main module 128, and a mobile network communication module 130. The application part 122 receives the text entered by a user, displays the caption data and controls the user interface and the wireless caption communication service. The dialer part 124 makes a voice call to the wireless captioning service server 200, and the OS/virtual machine part 126 controls or operates general functions of a mobile communication terminal or a mobile phone and such general functions include voice phone calls or connection to the packet services. The short-range wireless (or wired) communication main module 128 receives the voice from the short-range wireless communication module 116 or transmits the speech to the voice collecting device 110. The mobile network communication module 130 makes a connection to a mobile communication network.

The wireless caption communication terminal 120 may be a mobile terminal, a terminal for a vehicle, a mobile phone, a smart phone, PDA (Personal Digital Assistants), a laptop computer, a PMP (Portable Multimedia player), or the like.

For making a conversation between a hearing impaired person and another, a hearing impaired person or the first user may use the wireless caption communication terminal 120 and the other person or the second user may use the voice collecting device 110. The first person enters a text into the wireless caption communication terminal 120 and the text is converted into a speech. Then, the speech is transmitted to the voice collecting device 110 and the voice collecting device 110 outputs the speech so that the second user can hear the speech. On the other hand, the voice of the second user is received by the voice collecting device 110 and transmitted to the relay center 300. The relay center 300 converts the voice into the caption data and the caption data is transmitted to and displayed on the wireless caption communication terminal 120 so that the first user can see and read the caption data.

Figure 2:
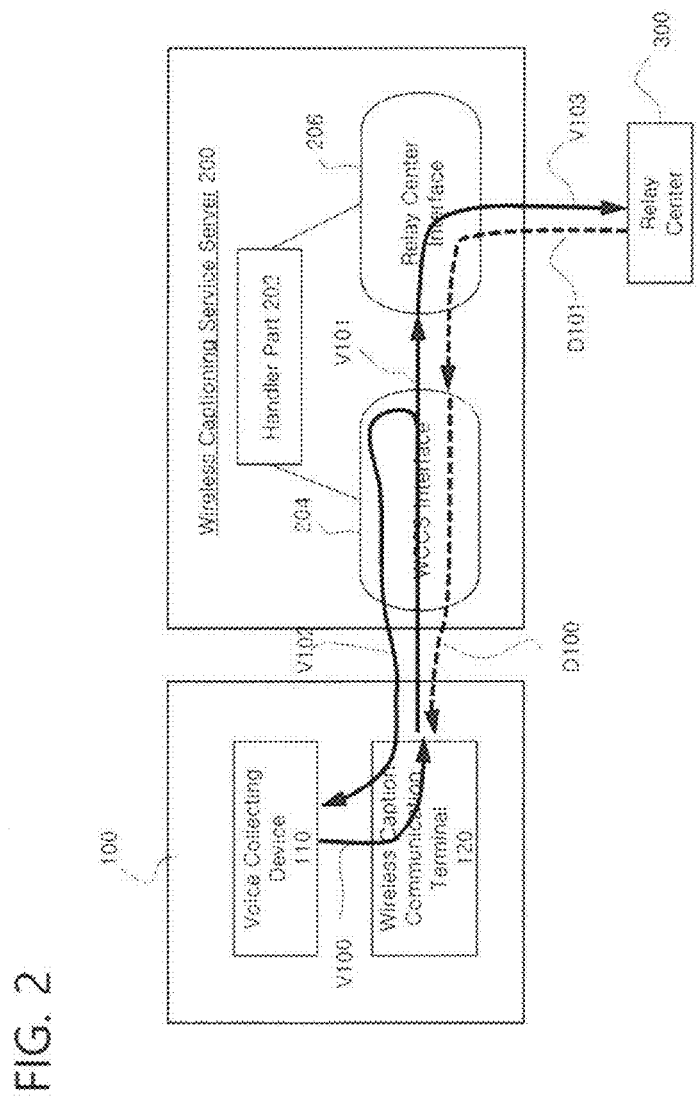
FIG. 2 shows an illustrative diagram of the wireless caption communication service system according to a preferred embodiment of the present invention.

FIG. 2 shows an illustrative diagram of the wireless caption communication service system according to a preferred embodiment of the present invention. The wireless captioning service server 200 includes a WCCS interface 204, a relay center interface 206, and a handler part 202. The WCCS interface 204 is connected to the wireless caption communication terminal 120 and the WCCS interface 204 controls the call and receives the voice from the wireless caption communication device 100. The relay center interface 206 is connected to the relay center 300 and the relay center interface 206 controls the call and transfers the voice to the relay center 300. Furthermore, the handler part 202 controls the WCCS interface 204 and the relay center interface 206.

The voice collected from the voice collecting device 110 is transferred to the wireless caption communication terminal 120 through the voice traffic pathway V100 and the WCCS interface 204 receives the voice from the wireless caption communication terminal 120 through the first voice traffic pathway V101. Then, the WCCS interface 204 converts the voice into white noise and transmits the white noise back to the wireless caption communication terminal 120 through the first voice traffic pathway V102.

If the first user enters a text into the wireless caption communication terminal 120, the text is transmitted to the WCCS interface 204 through the caption data traffic path D100 and the WCCS interface 204 converts the text into the speech. Then, the WCCS interface 204 transmits the speech, instead of the white noise, to the wireless caption communication terminal 120 through the first voice traffic pathway V102. The white noise or the speech, transmitted to the wireless caption communication terminal 120, is transmitted to the voice output unit 114 of the voice collecting device 110 through the voice traffic path V401. The relay center interface 206 transmits the voice to the relay center 300 through the second voice traffic path V103.

The relay center 300 converts the voice into the text-based caption data and the caption data is transmitted to the wireless caption communication terminal 120 through the second caption data traffic path D101 and the first caption data traffic path D100.

Figure 3:
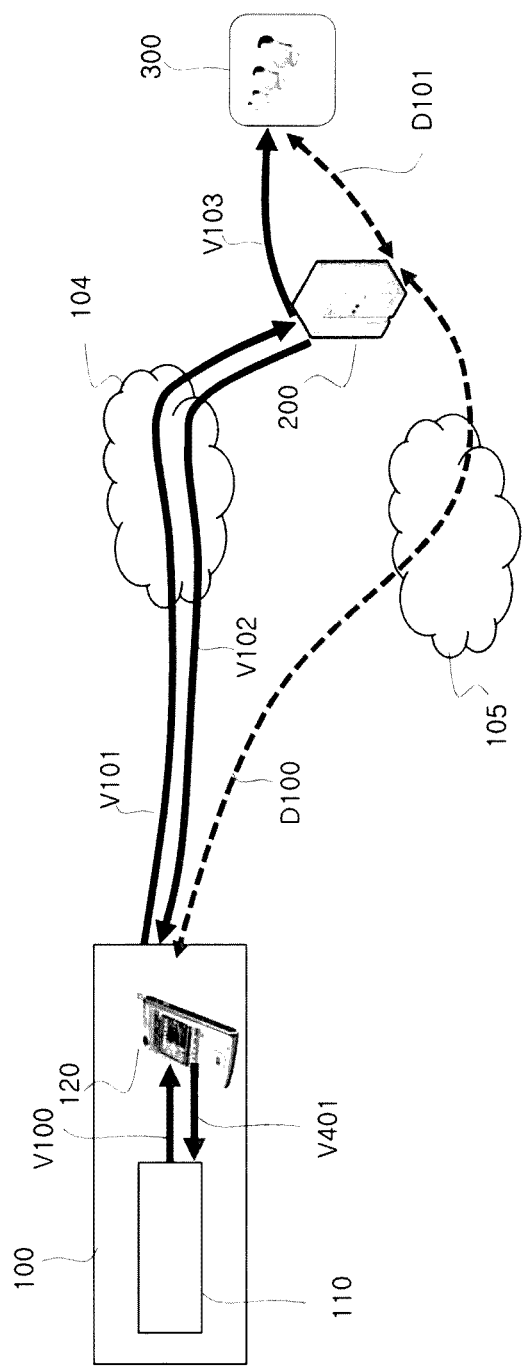
FIG. 3 shows an illustrative diagram of the network for the wireless caption communication service system when both of the circuit network and packet network are used.

FIG. 3 shows an illustrative diagram of the network for the wireless caption communication service system when both of the circuit network and packet network are used. The whole system of FIG. 3 comprises the wireless caption communication device 100 having the voice collecting device 110 and the wireless caption communication terminal 120, the wireless captioning service server 200, the wireless (or wired) circuit network 104, the wireless (or wired) packet network 105, and the relay center 300.

As shown in FIG. 3, the voice collecting device 110 is connected to the wireless caption communication terminal 120 through the short-range wireless (or wired) communication module 116. When a user makes a voice call through the application part 122 of the wireless caption communication terminal 120, the wireless caption communication terminal 120 makes a connection to the wireless captioning service server 200 through the circuit network 104 by the first voice traffic paths V101 and V102 and the wireless captioning service server 200 makes a connection to the relay center 300 by the second voice traffic path V103. At the same time of such connections, the wireless caption communication terminal 120 makes another connection to the wireless captioning service server 200 through the packet network 105 by the first caption data traffic path D100 and the wireless captioning service server 200 makes another connection to the relay center 300 by the second caption data traffic path D101. The relay center 300 receives the voice through the first and second voice traffic paths V101 and V103 and converts the voice into the text-based caption data. Then, the relay center 300 transmits the caption data back to the wireless caption communication terminal 120 through the second and first caption data traffic paths D101 and D100.

Figure 4:
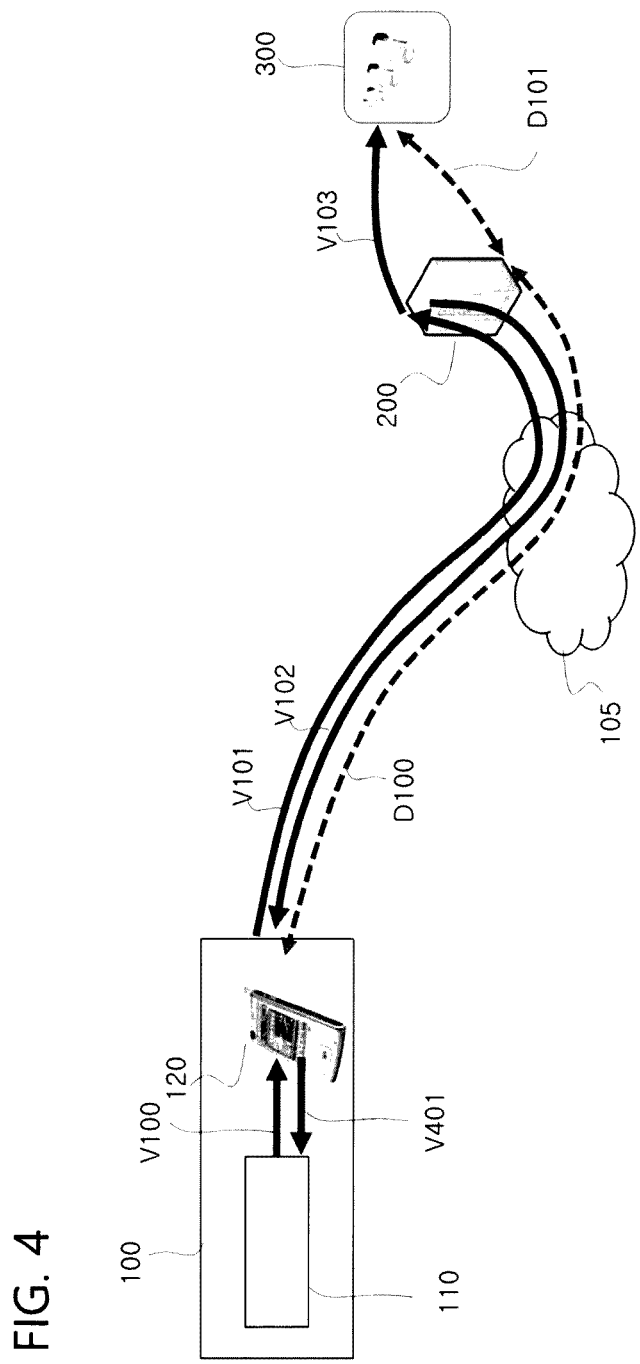
FIG. 4 shows an illustrative diagram of the network for the wireless caption communication service system when only the packet network is used.

FIG. 4 shows an illustrative diagram of the network for the wireless caption communication service system when only the packet network is used. The whole system of FIG. 4 comprises the wireless caption communication device 100 having the voice collecting device 110 and the wireless caption communication terminal 120, the wireless captioning service server 200, the wireless (or wired) packet network 105, and the relay center 300.

As shown in FIG. 4, the voice collecting device 110 is connected to the wireless caption communication terminal 120 through the short-range wireless (or wired) communication module 116. When a user makes a voice call through the application part 122 of the wireless caption communication terminal 120, the wireless caption communication terminal 120 makes a connection to the wireless captioning service server 200 through the packet network 105 by the first voice traffic paths V101 and V102 and the wireless captioning service server 200 makes a connection to the relay center 300 by the second voice traffic path V103. At the same time of such connections, the wireless caption communication terminal 120 makes another connection to the wireless captioning service server 200 through the packet network 105 by the first caption data traffic path D100 and the wireless captioning service server 200 makes another connection to the relay center 300 by the second caption data traffic path D101. The relay center 300 receives the voice through the first and second voice traffic paths V101 and V103 and converts the voice into the text-based caption data. Then, the relay center 300 transmits the caption data back to the wireless caption communication terminal 120 through the second and first caption data traffic paths D101 and D100.

Figure 5:
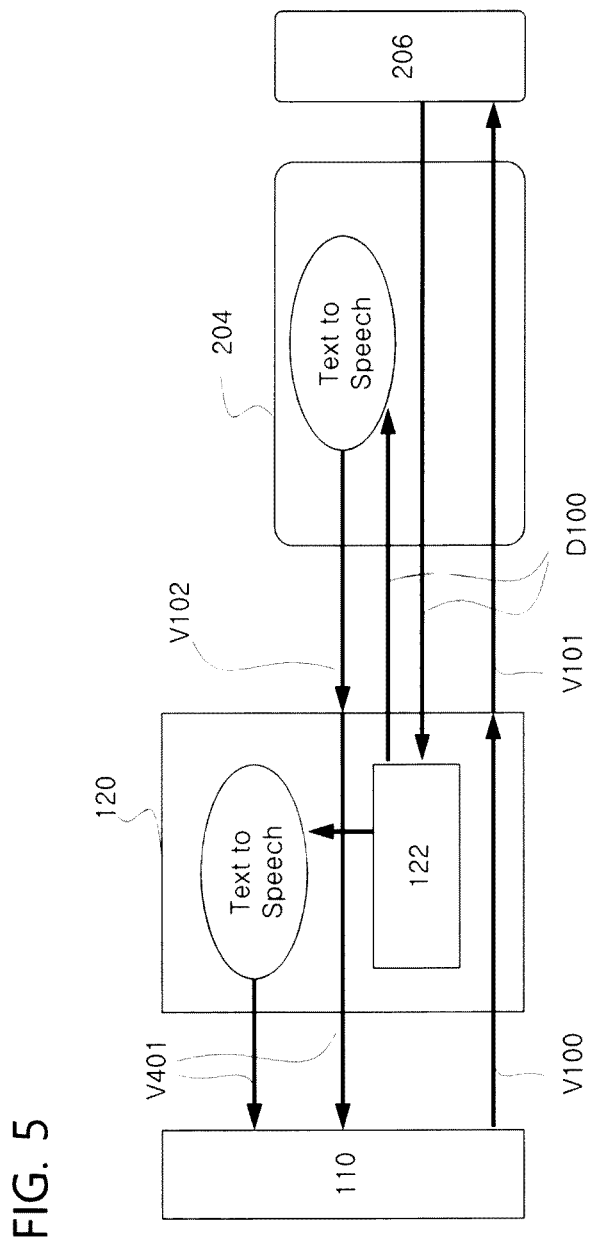
FIG. 5 shows a block diagram for the traffic paths of the text and speech according to a preferred embodiment of the present invention.

FIG. 5 shows a block diagram for the traffic paths of the text and speech according to a preferred embodiment of the present invention. The diagram of FIG. 5 shows the wireless caption communication device 100 having the voice collecting device 110 and the wireless caption communication terminal 120, the WCCS interface 204, and the relay center interface 206.

As shown in FIG. 5, the voice of the second user is transmitted to the WCCS interface 204 and then to the relay center interface 206 through the voice traffic path V101. The caption data is received by the relay center interface 206 and then transmitted to the wireless caption communication terminal 120 through the first caption data path D100.

On the other hand, the text, entered, typed or inputted by the first user, is transmitted to the WCCS interface 204 through the first caption data path D100. Then, the text is converted into the speech using the Text to Speech function. The speech converted from the text is transferred through the first voice traffic path V102 to the wireless caption communication terminal 120 and then to the voice collecting device 110.

If the wireless caption communication terminal 120 has the Text to Speech function, the text entered by the first user may be converted to the speech directly by the wireless caption communication terminal 120 using the Text to Speech function of the wireless caption communication terminal 120. Then, the speech is transmitted to the voice collecting device 110 through the voice traffic path V401.

To request the service of the present invention, the first user makes a voice call to the wireless captioning service server 200 using the dialer part 124 and the user interface provided by the application part 122 of the wireless caption communication terminal 120. At this time, the voice traffic paths V100 and V401 are made between the short range wireless (or wired) communication module 116 and the short range wireless (or wired) communication module 128. The first voice traffic paths V101 and V102 are made by the voice phone call function of the mobile network communication module 130, and then, the first caption data traffic path D100 is made right away by the packet data function of the mobile network communication module 130. Once each path is made and set, the voice of the second user is transmitted to the wireless captioning service server 200 through the voice traffic paths V100 and V101, and the caption data, received through the first caption data traffic path D100, is displayed to the first user using the application part 122. The text inputted by the first user is transmitted to the wireless captioning service server 200 through the first caption data traffic path D100 and converted into the speech. Then, the speech is transmitted to the wireless caption communication terminal 120 through the first voice traffic path V102 and then to the voice output unit 114 through the voice traffic path V401 and the sound of the speech comes out of the speaker of the voice collecting device 110.

Figure 6:
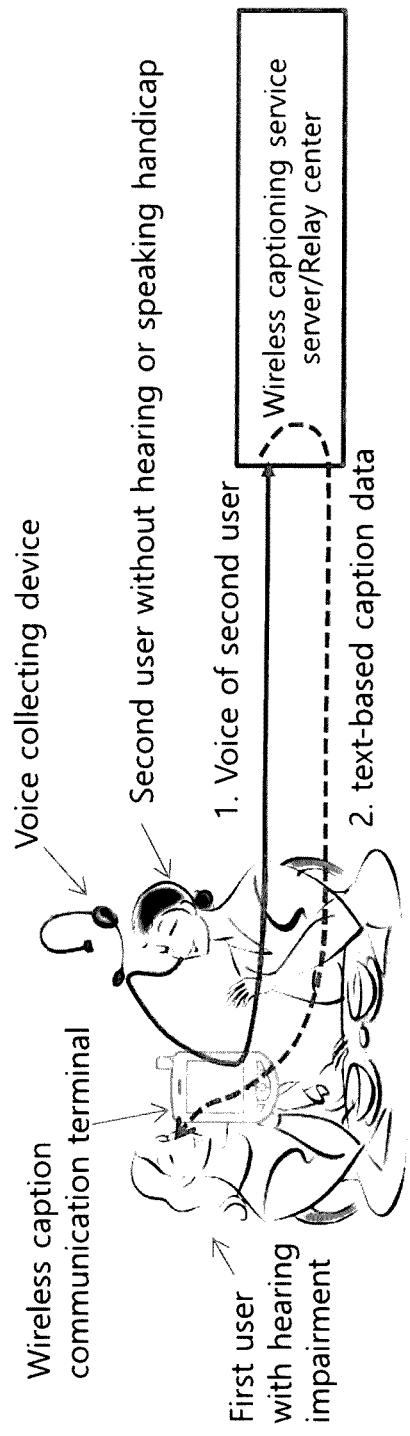
FIG. 6 shows a diagram illustrating a conversation between the first and second users using the present invention.
Figure 7:
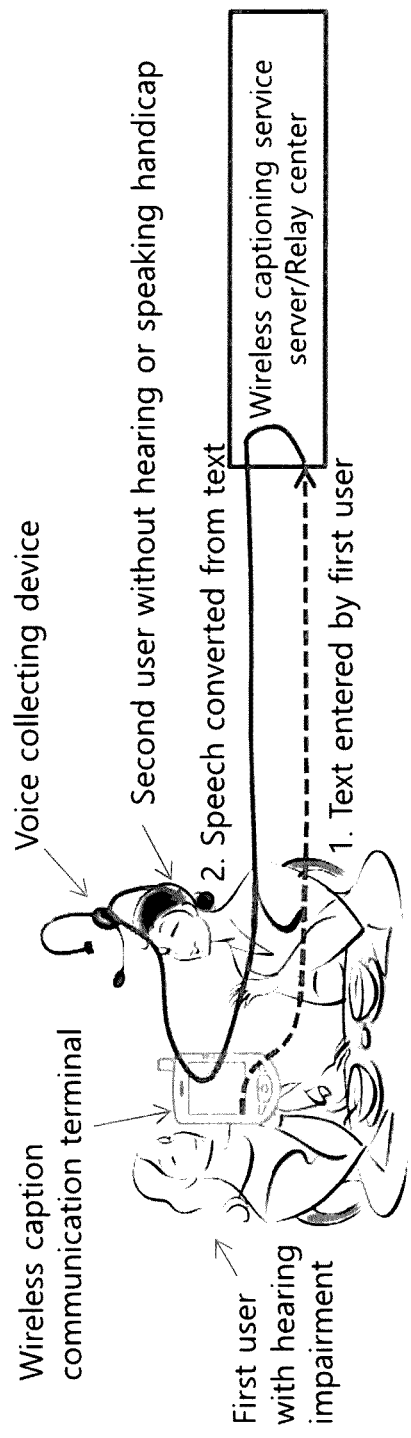
FIG. 7 shows another diagram illustrating a conversation between the first and second users using the present invention.

FIGS. 6 and 7 show diagrams illustrating a conversation between the first and second users using the present invention.

While the invention has been shown and described with reference to different embodiment thereof, it will be appreciated by those skilled in the art that variations in form, detail, compositions and operation may foe made without departing from the spirit and scope of the invention as defined by the accompanying claims.

What is claimed is:

1. A Wireless Caption Communication Service ("WCCS") System, comprising:
  a relay center for receiving a voice and converting the voice into a text-based caption data;
  a wireless caption communication device for connecting a voice call to conduct a conversation, receiving the caption data from the relay center and displaying the caption data, and receiving a text from a first user and outputting a speech converted from the text; and
  a wireless captioning service server for receiving the voice from a second user through a path set by the wireless caption communication device and transmitting the voice to the relay center, receiving the caption data converted from the voice by the relay center, and transmitting the caption data to the wireless caption communication device,
wherein the wireless caption communication device comprises:
  a voice collecting device for receiving and transmitting the voice of the second user and outputting the speech; and
  a wireless caption communication terminal for receiving the voice from the voice collecting device and transmitting the voice to the wireless captioning service server, receiving the speech and transmitting the speech to the voice collecting device, and receiving the caption data from the relay center and displaying the caption data,
wherein the voice collecting device comprises:
  a voice input unit for receiving the voice from the second user and converting the voice into an electrical signal through a microphone and transmitting the voice in a form of the electrical signal;
  a voice output unit for outputting the speech, which is received from the wireless caption communication terminal, through a speaker; and
  a short-range wireless (or wired) communication module for receiving the voice from the voice input unit and transmitting the voice to the wireless caption communication terminal, wherein the wireless caption communication terminal comprises an application part for controlling an interface with the first user and a wireless caption communication service, and
transmitting the text to the wireless captioning service server or converting the text into the speech without transmitting the text to the wireless captioning service server.

2. The WCCS System of claim 1, wherein the wireless caption communication terminal comprises:
- a dialer part for making a voice call;
- an OS/virtual machine part for controlling or operating a voice call or connection with a packet service;
- a short-range wireless (or wired) communication main module for receiving the voice from the short-range wireless (or wired) communication module of the voice collecting device; and
- a mobile network communication module for making a connection with a mobile communication network.

3. The WCCS System of claim 1, wherein the wireless captioning service server comprises:
- a WCCS interface for being connected to the wireless caption communication terminal, controlling a call, and receiving the voice from the wireless caption communication device;
- a relay center interface for being connected to the relay center, controlling the call, and transmitting the voice to the relay center; and
- a handler part for controlling the WCCS interface and the relay center interface.

4. The WCCS System of claim 3, wherein the WCCS interface transmits the voice to the relay center interface, and converting the text into the speech, and transmitting the speech to the wireless caption communication device.

5. A Wireless Caption Communication Service ("WCCS") System for conversation between first and second users, comprising:
- a wireless caption communication device having a wireless caption communication terminal used by the first user and a voice collecting device used by the second user;
- a wireless captioning service server; and
- a relay center, wherein a voice of the second user is received by the voice collecting device and transmitted to the wireless captioning service server and then to the relay center,
wherein the relay center converts the voice into a text-based caption data and the caption data is transmitted to the wireless captioning service server and then to the wireless caption communication terminal, the caption data being displayed on the wireless caption communication terminal,
wherein a text entered by the first user into the wireless caption communication terminal is converted into a speech by the wireless caption communication terminal or the wireless captioning service server, and the speech comes out of a voice output unit of the voice collecting device,
wherein the wireless captioning service server converts the voice into a white noise and transmits the white noise to the wireless caption communication terminal.

6. The WCCS System of claim 5, wherein the text is converted into the speech by the wireless captioning service server and the wireless captioning service server transmits to the wireless caption communication terminal either the white noise or the speech, not both.

7. The WCCS System of claim 5, wherein the voice collecting device comprises:
- a voice input unit for receiving the voice from the second user;
- a voice output unit for outputting the speech; and
- a short-range wireless (or wired) communication module for receiving the voice from the voice input unit and transmitting the voice to the wireless caption communication terminal.

8. The WCCS System of claim 7, wherein the wireless caption communication terminal comprises:
- an application part for controlling a user interface and the WCCS System;
- a dialer part for making a voice call;
- an OS/virtual machine part for controlling or operating a voice call or making a connection with a packet service;
- a short-range wireless (or wired) communication main module for receiving the voice from the short-range wireless (or wired) communication module of the voice collecting device; and
- a mobile network communication module for making a connection with a mobile communication network, wherein the application part transmits the text to the wireless captioning service server or converts the text into the speech without transmitting the text to the wireless captioning service server.

9. The WCCS System of claim 5, wherein the wireless captioning service server comprises:
- a WCCS interface for being connected to the wireless caption communication terminal and receiving the voice from the wireless caption communication device;
- a relay center interface for being connected to the relay center and transmitting the voice to the relay center; and
- a handler part for controlling the WCCS interface and the relay center interface.

* * * * *